United States Patent
Hu et al.

(10) Patent No.: US 9,985,533 B2
(45) Date of Patent: May 29, 2018

(54) CONTROL CIRCUIT HAVING ADAPTIVE BLANKING TIME AND METHOD FOR PROVIDING THE SAME

(71) Applicant: Silergy Semiconductor Technology (Hangzhou) LTD, Hangzhou, ZheJiang Province (CN)

(72) Inventors: Zhiliang Hu, Hangzhou (CN); Yongjiang Bai, Hangzhou (CN); Qiukai Huang, Hangzhou (CN); Le Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days. days.

(21) Appl. No.: 15/408,564

(22) Filed: Jan. 18, 2017

(65) Prior Publication Data
US 2017/0214326 A1   Jul. 27, 2017

(30) Foreign Application Priority Data
Jan. 22, 2016   (CN) .......................... 2016 1 0048123

(51) Int. Cl.
*H02M 3/335* (2006.01)
*H02M 3/337* (2006.01)
*H02M 1/00* (2006.01)

(52) U.S. Cl.
CPC ....... *H02M 3/33507* (2013.01); *H02M 3/335* (2013.01); *H02M 3/337* (2013.01); *H02M 2001/0048* (2013.01)

(58) Field of Classification Search
CPC .................................................... H02M 3/335
See application file for complete search history.

(56) References Cited

U.S. PATENT DOCUMENTS

| | | | |
|---|---|---|---|
| 6,218,787 B1 | 4/2001 | Murcko et al. | |
| 7,239,532 B1* | 7/2007 | Hsu ................... | H02M 3/33523 363/21.12 |
| 8,416,587 B2 | 4/2013 | Chen | |
| 8,917,528 B2 | 12/2014 | Xu | |
| 9,131,582 B2 | 9/2015 | Chen | |
| 9,198,245 B2 | 11/2015 | Deng et al. | |
| 2013/0250629 A1 | 9/2013 | Xu | |

(Continued)

FOREIGN PATENT DOCUMENTS

CN    103715898 A    4/2014

*Primary Examiner* — Jue Zhang
*Assistant Examiner* — Trinh Q Dang
(74) *Attorney, Agent, or Firm* — Michael C. Stephens, Jr.

(57) ABSTRACT

A control circuit can include: a blanking time control circuit configured to generate a blanking control signal according to a peak current of a main switch of a power stage circuit of a flyback converter; a sampling time control circuit configured to generate a sampling time control signal according to the blanking control signal and a feedback voltage signal; and a voltage detection circuit configured to receive the feedback voltage signal and the sampling time control signal, and to determine the time of detecting the feedback voltage signal according to the sampling time control signal to obtain a detection signal for controlling the main switch, where the voltage detection circuit stops detecting the feedback voltage signal when the blanking control signal is active, and the period during which the blanking control signal is active is adjustable along with the peak current.

6 Claims, 7 Drawing Sheets

(56) References Cited

U.S. PATENT DOCUMENTS

2014/0211519 A1 7/2014 Hsu et al.
2015/0103569 A1* 4/2015 Zhang ............... H02M 3/33507
363/21.16

* cited by examiner ly related to each. This of the present invention.

CONTROL CIRCUIT HAVING ADAPTIVE BLANKING TIME AND METHOD FOR PROVIDING THE SAME

RELATED APPLICATIONS

This application claims the benefit of Chinese Patent Application No. 201610048123.1, filed on Jan. 22, 2016, which is incorporated herein by reference in its entirety.

FIELD OF THE INVENTION

The present invention generally relates to the field of power electronics, and more particularly to control circuits having an adaptive blanking time and associated control methods.

BACKGROUND

Driving the gate of a main power switch in a switching power supply may have a great impact on power performance. Serious electromagnetic interference (EMI) may result because of relatively large di/dt and dv/dt of the main power switch if the driving capacity is too strong (e.g., the driving current is too large). Also, switching losses may increase because of slow switching speeds due to relatively large switching delays of the main power switch if the driving capacity is too weak (e.g., the driving current is too small).

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
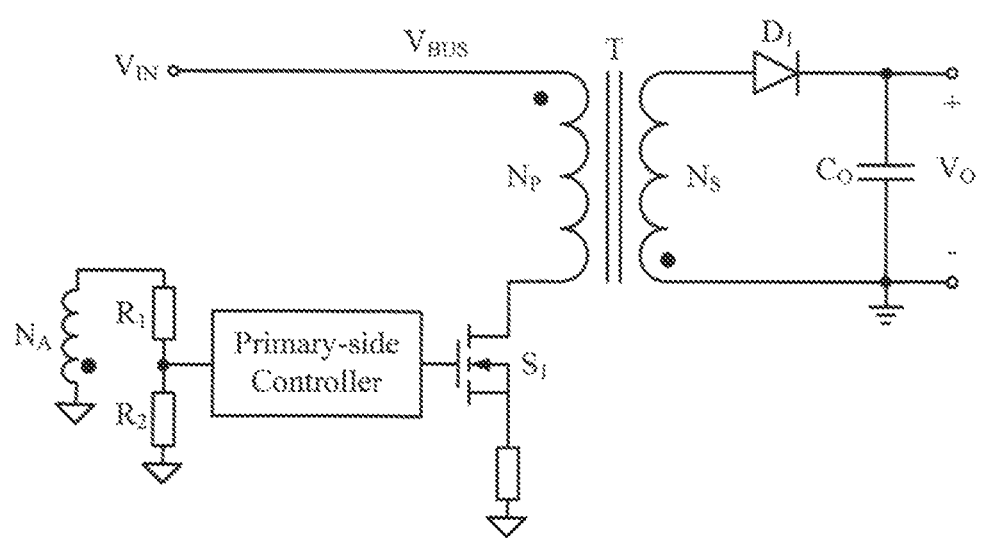
FIG. 1 is a schematic block diagram of an example primary controlled flyback converter.

Referring now to FIG. 1, shown is a schematic block diagram of an example primary controlled flyback converter. In this particular example, an auxiliary winding at the primary side can be coupled to a secondary winding of a transformer to obtain a feedback signal that represents the output voltage. This is because the output voltage is proportional to a voltage across the auxiliary winding when a freewheeling current through a secondary winding diode $D_1$ approaches zero. Thus, the output voltage can be well controlled by sampling the voltage across the auxiliary winding as the feedback signal of the output voltage. When the secondary current is zero, the voltage across the auxiliary winding may no longer be clamped by the output voltage, and may vibrate and have a relatively large voltage drop. Thus, the sampling time may usually be determined by sampling the voltage drop.

However, due to the presence of the leakage-inductance of the transformer and the reverse recovery diode of an auxiliary power supply and other effects, the voltage across the auxiliary winding may vibrate heavily after a main switch at the primary side is turned off, which can result in "mis-detection" of the feedback voltage. Therefore, a blanking time can be set after the main switch at the primary side is turned off, and sampling can begin by escaping the vibration time period. However, it may be difficult to appropriately set the blanking time because the vibration time period is not a fixed time period, and may change along with the peak current of the main switch at the primary side.

In one approach, a relatively longer blanking time can be set in order to avoid mis-detection when the peak current of the main switch at the primary side is relatively large. In another approach, an adaptive blanking time can be set according to the load condition. In the first approach, the blanking time can be relatively long even when the peak current is relatively small. This can mean a relatively large phantom load can exist in order to meet requirements of the blanking time in a no-load condition. Thus, the power losses in the no-load condition may be relatively large, which can adversely affect energy-saving demands. In the second approach, the load condition may not precisely indicate the peak current in some applications. For example, in a constant on time control power factor correction (PFC) circuit, the peak current may increase along with the input voltage while the load remains unchanged. Thus, the detection may not be correct if the blanking time is set based on the load condition.

In one embodiment, a control circuit can include: (i) a blanking time control circuit configured to generate a blanking control signal according to a peak current of a main switch of a power stage circuit of a flyback converter, where the power stage circuit comprises a transformer having primary and secondary windings, the main switch coupled to the primary winding, and a rectifying diode coupled to the secondary winding; (ii) a sampling time control circuit configured to generate a sampling time control signal according to the blanking control signal and a feedback voltage signal, where the feedback voltage signal represents an output voltage signal at the secondary side of the transformer; and (iii) a voltage detection circuit configured to receive the feedback voltage signal and the sampling time control signal, and to determine the time of detecting the feedback voltage signal according to the sampling time control signal in order to obtain a detection signal for controlling the main switch, where the voltage detection circuit stops detecting the feedback voltage signal when the blanking control signal is active, and the period during which the blanking control signal is active is adjustable along with the peak current.

Figure 2:
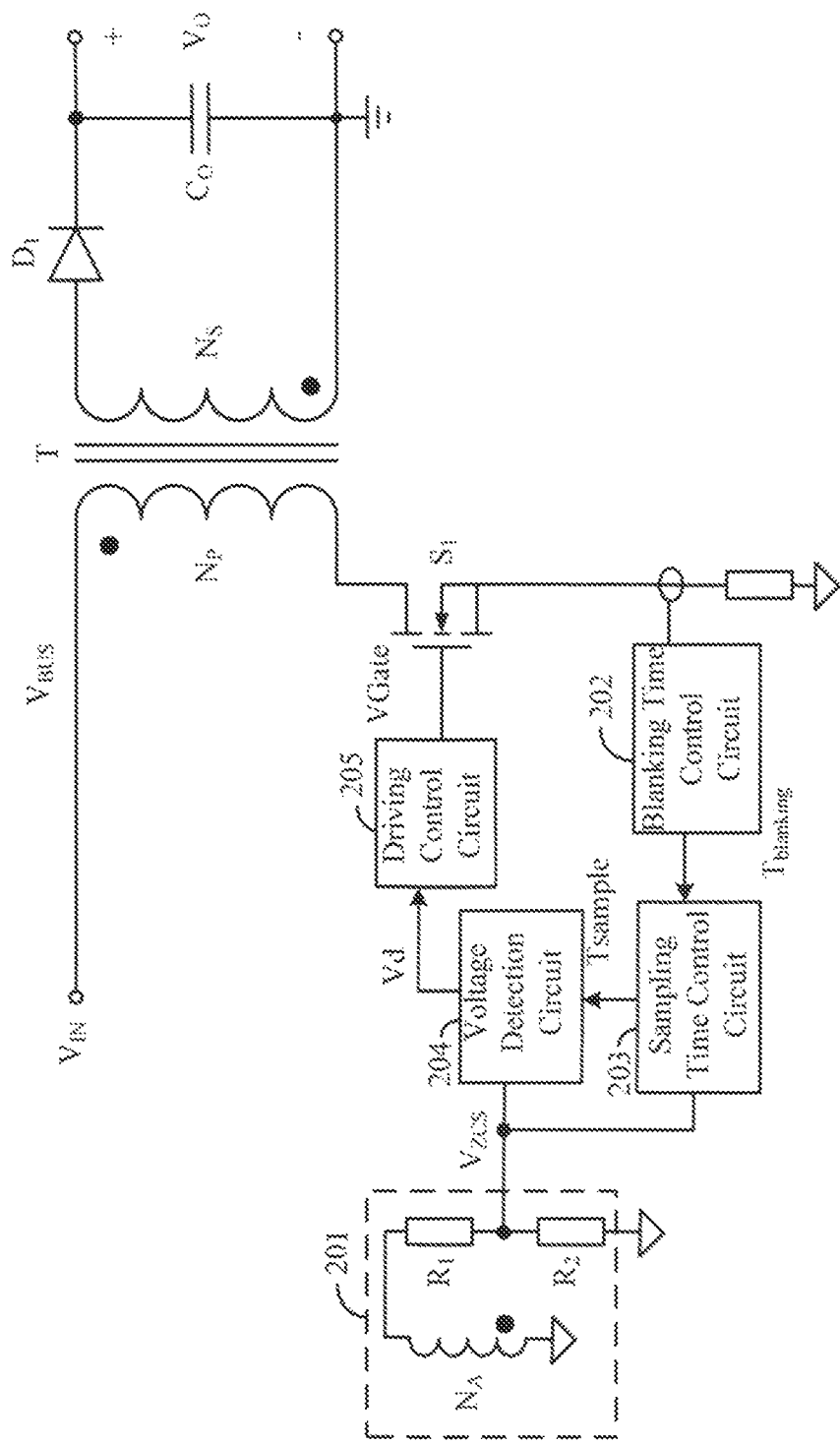
FIG. 2 is a schematic block diagram of an example control circuit having an adaptive blanking time, in accordance with embodiments of the present invention.

Referring now to FIG. 2, shown is a schematic block diagram of an example control circuit having an adaptive blanking time, in accordance with embodiments of the present invention. In this particular example, the flyback converter can receive input voltage signal $V_{IN}$, and may generate a substantially stable output voltage Vo for a load. For example, the flyback converter can include transformer T having primary winding Np and secondary winding Ns, main switch $S_1$ coupled to the primary winding, and a rectifying device coupled to a secondary winding. In this example, diode $D_1$ can be used as the rectifying device with the anode connected to the secondary winding and the cathode connected to the output terminal.

The control circuit can include output voltage feedback circuit 201, blanking time control circuit 202, sampling time control circuit 203, voltage detection circuit 204, and driving control circuit 205. Output voltage feedback circuit 201 can generate feedback voltage signal $V_{ZCS}$ that represents the output voltage, and may include auxiliary winding $N_A$, and division resistors R1 and R2. In this example, blanking time control circuit 202 can generate blanking control signal $T_{blanking}$ according to peak current information of the main switch. Sampling time control circuit 203 can generate sampling time control signal Tsample according to blanking control signal $T_{blanking}$ and feedback voltage signal $V_{ZCS}$. Voltage detection circuit 204 can receive feedback voltage signal $V_{ZCS}$ and sampling time control signal Tsample, and may determine the time for detecting the feedback voltage according to the sampling time control signal, in order to obtain detection signal Vd. Driving control circuit 205 can control main switch $S_1$ by switching control signal VGate according to detection signal Vd.

Figure 5:
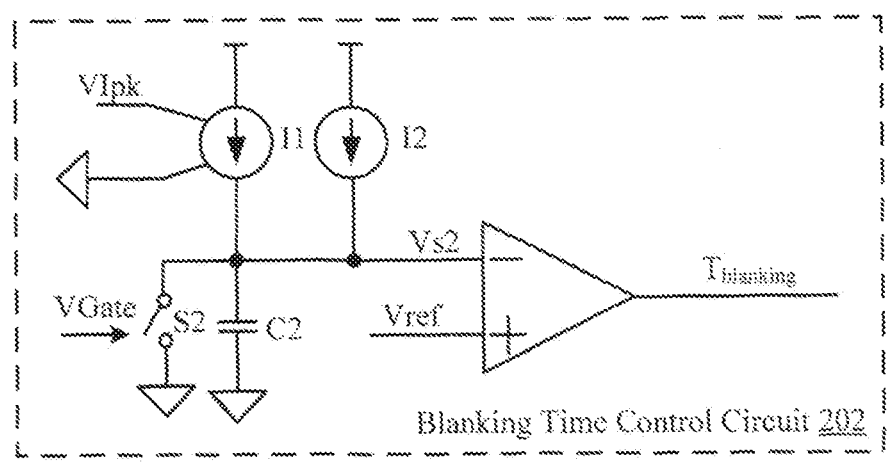
FIG. 5 is a schematic block diagram of an example blanking time control circuit of the control circuit of FIG. 2, in accordance with embodiments of the present invention.

Referring forward to FIG. 5, shown is a schematic block diagram of an example blanking time control circuit of the control circuit of FIG. 2, in accordance with embodiments of the present invention. In this particular example, blanking time control circuit 202 can include a charge and discharge circuit and a comparison circuit. The charge and discharge circuit can include current source I1 being configured to generate current signal I1 according to the peak current information of the main switch, switch S2, and capacitor C2 coupled in parallel to switch S2.

In this example, current signal I1 can be inversely proportional to peak current $V_{IPK}$. Current source I1 can be configured to charge capacitor C2, and a voltage across capacitor C2 may be configured as voltage signal Vs2. The comparison circuit can include a comparator having an inverting input terminal that receives voltage signal Vs2, and a non-inverting input terminal that receives reference signal Vref. The comparator can compare voltage signal Vs2 against reference signal Vref, and may generate blanking control signal $T_{blanking}$. For example switch S2 can be controlled by the switching control signal of the main switch (e.g., switch $S_1$). In this example, the blanking time control circuit may also include current source I2 (e.g., a fixed current source used to charge capacitor C2) coupled in parallel to current source I1. Current source I2 can be used to ensure that the blanking time has a maximum value, to ensure that sampling will not be carried out during the vibration state of the feedback voltage signal.

Figure 3:
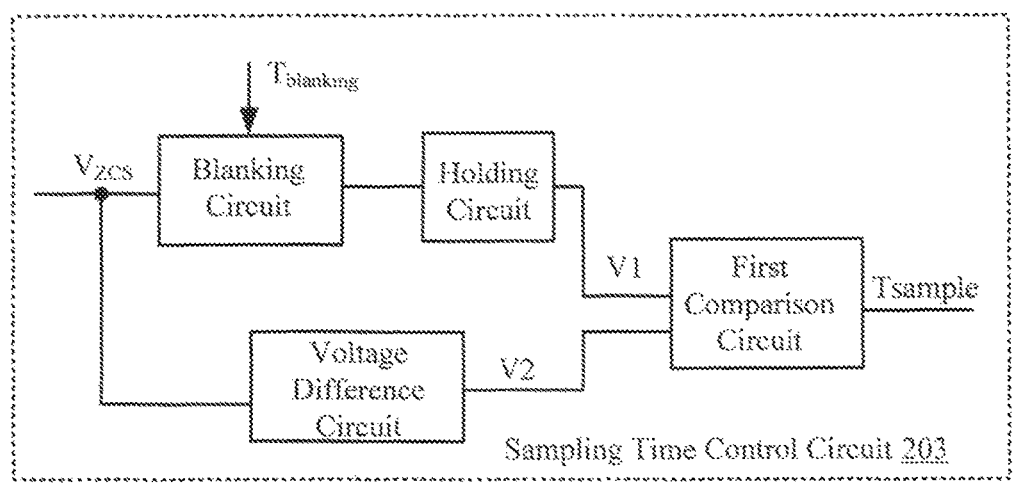
FIG. 3 is a schematic block diagram of an example sampling time control circuit of the control circuit FIG. 2, in accordance with embodiments of the present invention.
Figure 4:
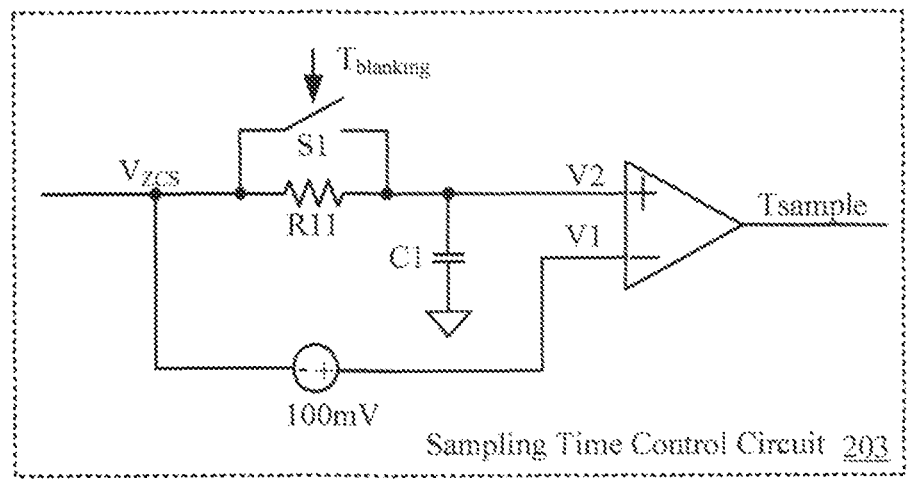
FIG. 4 is a more detailed schematic block diagram of the example sampling time control circuit of FIG. 3, in accordance with embodiments of the present invention.

Referring now to FIGS. 3 and 4, shown are schematic block diagrams of an example sampling time control circuit of the control circuit FIG. 2, in accordance with embodiments of the present invention. In this example, the blanking circuit can include resistor R11 coupled to switch S1. Resistor R11 may have a first terminal configured to receive feedback voltage signal $V_{ZCS}$, and a second terminal coupled to the holding circuit. Also, switch S1 can be controlled by blanking control signal $T_{blanking}$.

The holding circuit can include capacitor C1 having a first terminal coupled to the second terminal of resistor R11, and a second terminal that is grounded. When blanking control signal $T_{blanking}$ is active, switch S1 can be turned on, and feedback voltage signal $V_{ZCS}$ may be directly transmitted to capacitor C1. When the blanking control signal is inactive, the blanking circuit may transmit feedback voltage signal $V_{ZCS}$ to capacitor C1 through resistor R11. The voltage across capacitor C1 may be configured as holding signal V2, and resistor R11 and capacitor C1 can form a delay circuit.

A voltage difference circuit can include a voltage source having an inverting terminal that receives the feedback voltage signal, and a non-inverting terminal coupled to a comparison circuit. For example, the voltage source may have a relatively small value (e.g., about 100 mV). Also, voltage signal V1 that is greater than feedback voltage signal $V_{ZCS}$ can be obtained through the voltage difference circuit. The comparison circuit can include a comparator having a non-inverting input terminal that receives holding signal V2, an inverting input terminal that receives voltage signal V1, and an output terminal that generates sampling time control signal $T_{sample}$. When holding signal V2 is greater than voltage signal V1, the sampling time control signal may go high.

The period during which blanking control signal $T_{blanking}$ is in an active state can be referred as the blanking time. During the blanking time, switch S1 may be turned on, and the comparator may not change states. Thus, the feedback voltage signal will not be detected even as feedback voltage signal $V_{ZCS}$ fluctuates, so as to achieve the blanking function. While this particular sampling time control circuit is only one example implementation, those skilled in the art will recognize that other sampling time control circuits can also be utilized.

In one embodiment, a method can include: (i) generating a blanking control signal according to a peak current of a main switch of a power stage circuit of a flyback converter, where the power stage circuit comprises a transformer having primary and secondary windings, the main switch coupled to the primary winding, and a rectifying diode coupled to the secondary winding; (ii) generating a sampling time control signal according to the blanking control signal and a feedback voltage signal; (iii) receiving the feedback voltage signal and the sampling time control signal, and determining the time of detecting the feedback voltage signal according to the sampling time control signal in order to obtain a detection signal for controlling the main switch; and (iv) using the feedback voltage signal to represent an output voltage at the secondary side of the transformer, where the voltage detection circuit stops detecting the feedback voltage signal when the blanking control signal is active, and the period during which the blanking control signal is active is adjustable along with the peak current.

Figure 6:
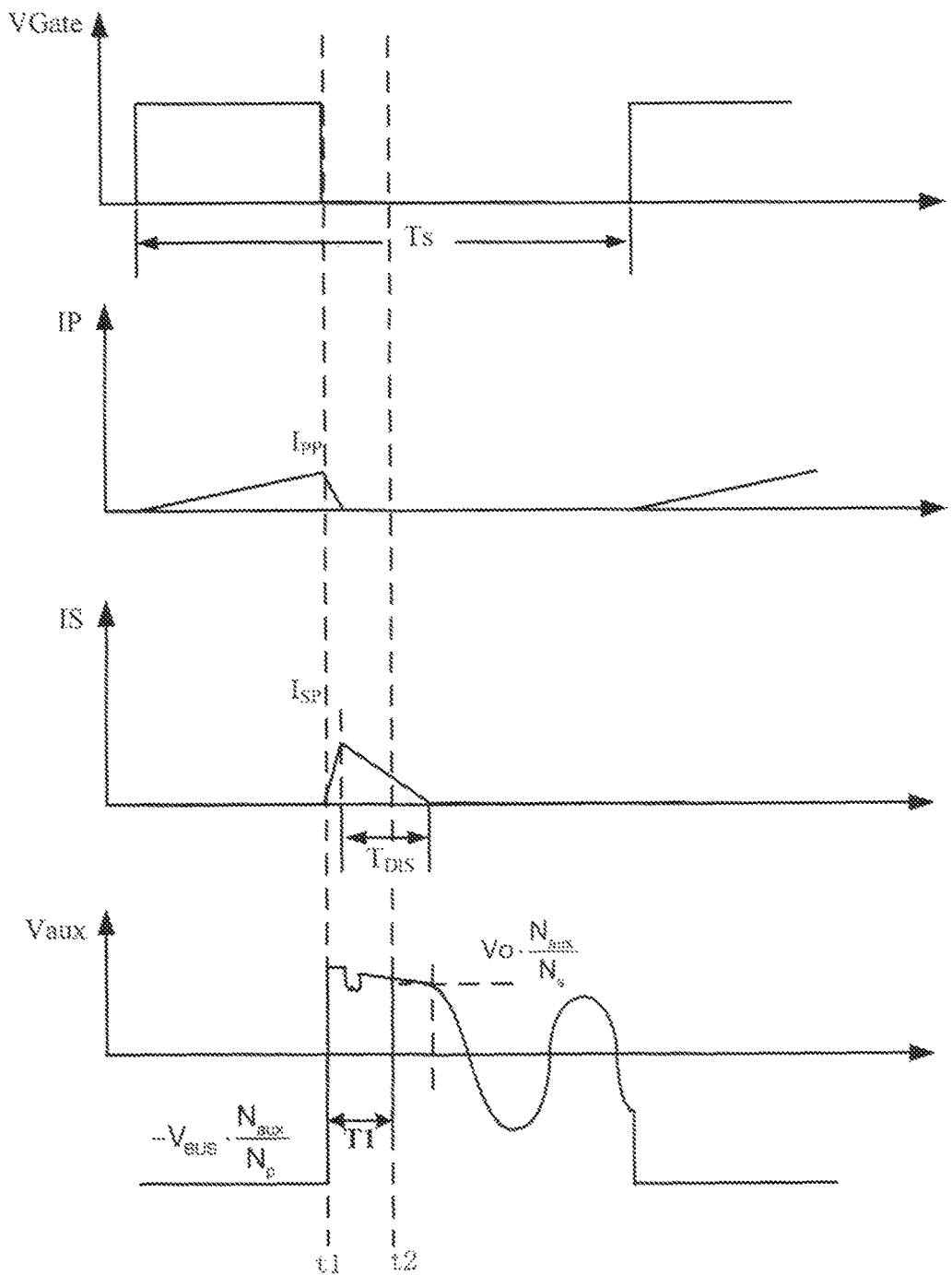
FIG. 6 is a waveform diagram showing a first example operation of the circuit of FIG. 2, in accordance with embodiments of the present invention.

Referring now to FIG. 6, shown is a waveform diagram of a first example operation of the circuit of FIG. 2, in accordance with embodiments of the present invention. When the system is in a discontinuous operating mode under a light-load condition, peak current $I_{PP}$ of the main switch at the primary side may be relatively small. As shown, "IS" is a discharge current of the secondary diode. At time t1, the main switch S1 is turned off, and the feedback voltage signal of the secondary winding can fluctuate. In this case, the discharge time (e.g., $T_{DIS}$) of the secondary side may be relatively short. Thus, the time period (e.g., time period T1 in FIG. 6) during which the blanking control signal is active may be relatively short, such that the voltage detecting circuit can quickly detect feedback voltage signal $V_{ZCS}$.

Figure 7:
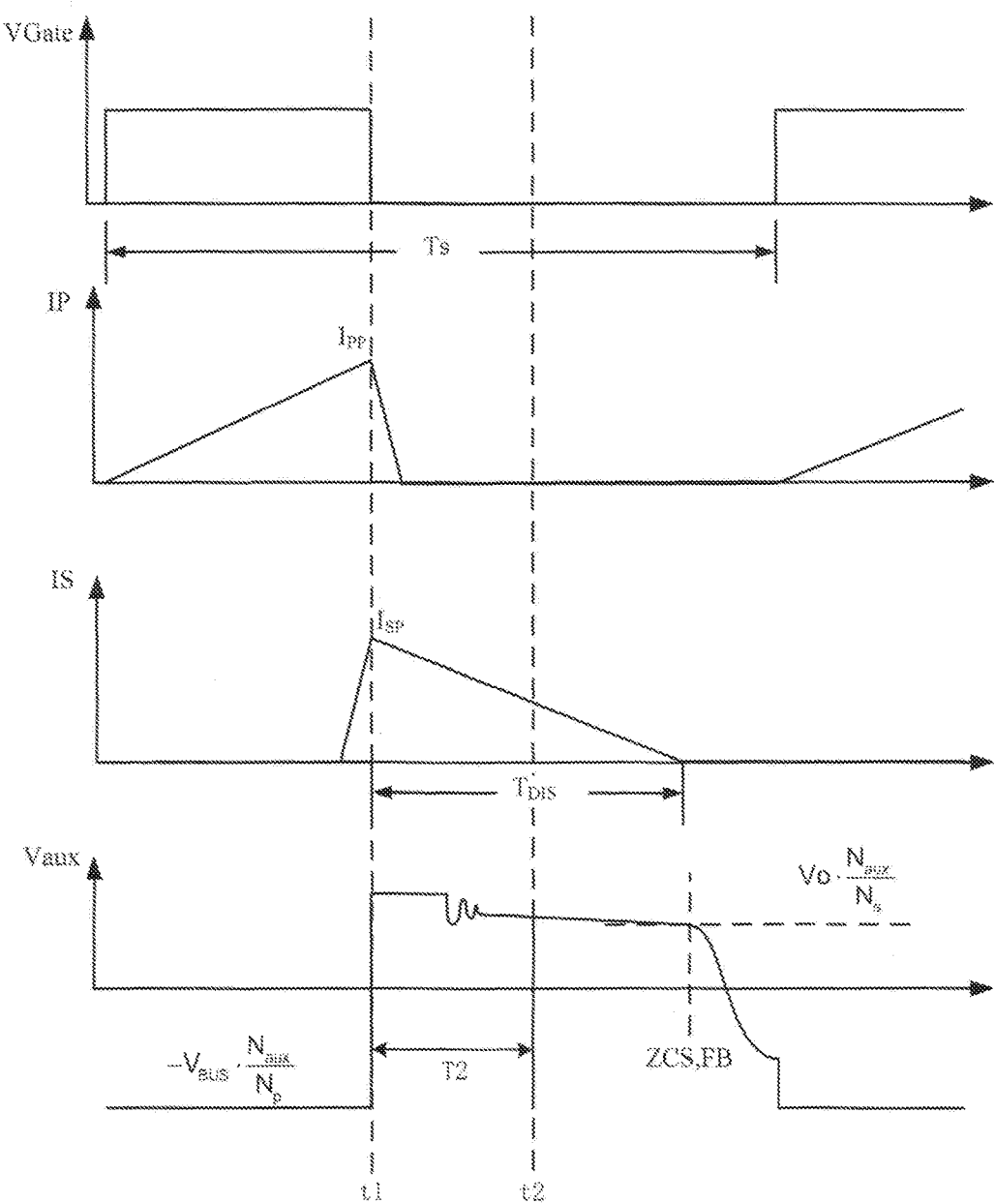
FIG. 7 is a waveform diagram showing a second example operation of the circuit of FIG. 2, in accordance with embodiments of the present invention.

Referring now to FIG. 7, shown is a waveform diagram of a second example operation of the circuit of FIG. 2, in accordance with embodiments of the present invention. When the system is in a quasi-resonant operating mode under a heavy-load condition, the peak current $I_{PP}$ of the main switch at the primary side can be relatively large. As shown, "IS" is the discharge current of the secondary diode. At time t1, main switch S1 can be turned off, and the feedback voltage signal of the secondary winding can fluctuate. In this case, the discharge time (e.g., $T_{DIS}$) of the secondary side may be relatively long. Thus, the time period (e.g., time period T2 in FIG. 7) during which the blanking control signal is active may be relatively long, such that the voltage detecting circuit can precisely detect feedback voltage signal $V_{ZCS}$ by avoiding the fluctuation of the feedback voltage signal.

In particular embodiments, the system can detect the feedback voltage according to practical applications rather than being affected by environmental or load interference, by controlling the length of the blanking time based on the peak current of the main switch. In addition, the control of the peak current may not be limited by the operation modes, and the system may operate in a peak current control mode or a constant on time control mode, or other appropriate operating modes. Thus, controlling the blanking time according in certain embodiments can be applied to primary controlled flyback converters in any suitable applications with high detection accuracy.

In particular embodiments, in a method for providing an adaptive blanking time to a flyback converter, a main power stage of the main power switch can include a transformer having of a primary winding and a secondary winding, a main switch coupled to the primary winding, a rectifying diode being coupled to the secondary winding. The method can include obtaining a blanking control signal according to a peak current information of the main switch. The method can also include generating a sampling time control signal according to the blanking control signal and the feedback voltage signal. The method can also include receiving the feedback voltage signal and the sampling time control signal, and determining the time of detecting the feedback voltage signal according to the sampling time control signal to obtain a detection signal for controlling the main switch.

For example, the feedback voltage signal can represent an output voltage at the secondary side. When the blanking control signal is active, the feedback voltage signal may not be detected, and the period during which the blanking control signal is active is adjustable along with the peak current. Generation of the blanking control signal can include charging a capacitor by a current source, to generate a voltage signal across the capacitor, and comparing the voltage signal against the reference signal, to generate the blanking control signal. The current source can generate a current signal according to the peak current information of the main switch.

Generation of the sampling time control signal can include receiving the feedback voltage signal and the blanking control signal, and transmitting the feedback voltage signal to a holding circuit directly when the blanking control signal is active, and transmitting the feedback voltage signal to the holding circuit through a delay circuit when the blanking control signal is inactive. The holding circuit can generate a holding signal based on the feedback voltage signal. Generation of the sampling time control signal can also include receiving the feedback voltage signal, and obtaining a voltage signal that is greater than the feedback voltage signal by difference operation, receiving the voltage signal and the holding signal, and generating the sampling time control signal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit, comprising:
    a) a blanking time control circuit configured to generate a blanking control signal according to a peak current of a main switch of a power stage circuit of a flyback converter, wherein said power stage circuit comprises a transformer having primary and secondary windings, said main switch coupled to said primary winding, and a rectifying diode coupled to said secondary winding;
    b) a sampling time control circuit configured to generate a sampling time control signal according to said blanking control signal and a feedback voltage signal, wherein said feedback voltage signal represents an output voltage signal at the secondary side of said transformer;
    c) a voltage detection circuit configured to receive said feedback voltage signal and said sampling time control signal, and to determine the time of detecting said feedback voltage signal according to said sampling time control signal in order to obtain a detection signal for controlling said main switch, wherein said voltage detection circuit stops detecting said feedback voltage signal when said blanking control signal is active, and the period during which said blanking control signal is active is adjustable along with said peak current;
    d) a blanking circuit configured to receive said feedback voltage signal and said blanking control signal;
    e) a holding circuit coupled to an output terminal of said blanking circuit for receiving said feedback voltage signal and providing a holding signal, wherein said feedback voltage signal is directly transmitted to said holding circuit when said blanking control signal is active, and said feedback voltage signal is transmitted to said holding circuit through a delay circuit when said blanking control signal is inactive;
    f) a voltage difference circuit configured to receive said feedback voltage signal, and to generate a first voltage signal that is greater than said feedback voltage signal; and
    g) a comparison circuit configured to receive said first voltage signal and said holding signal, and to generate said sampling time control signal.

2. The control circuit of claim 1, wherein:
    a) said blanking circuit comprises a first resistor and a first switch coupled in parallel to said first resistor, said first resistor having a first terminal for receiving said feedback voltage signal, and a second terminal coupled to said holding circuit, wherein said first switch is controlled by said blanking control signal;

b) said holding circuit comprises a first capacitor having a first terminal coupled to a second terminal of said first resistor, and a second terminal that is grounded, wherein a voltage across said first capacitor is configured as said holding signal, and said first resistor and said first capacitor form said delay circuit;

c) said voltage difference circuit comprises a first voltage source having a negative pole for receiving said feedback voltage signal, and a positive pole coupled to said first comparison circuit; and d) said comparison circuit comprises a first comparator having a non-inverting input for receiving said holding signal, and an inverting input for receiving said first voltage signal, wherein said sampling time control signal is activated when said holding signal is greater than said first voltage signal.

3. A control circuit, comprising:

a) a blanking time control circuit configured to generate a blanking control signal according to a peak current of a main switch of a power stage circuit of a flyback converter, wherein said power stage circuit comprises a transformer having primary and secondary windings, said main switch coupled to said primary winding, and a rectifying diode coupled to said secondary winding;

b) a sampling time control circuit configured to generate a sampling time control signal according to said blanking control signal and a feedback voltage signal, wherein said feedback voltage signal represents an output voltage signal at the secondary side of said transformer;

c) a voltage detection circuit configured to receive said feedback voltage signal and said sampling time control signal, and to determine the time of detecting said feedback voltage signal according to said sampling time control signal in order to obtain a detection signal for controlling said main switch, wherein said voltage detection circuit stops detecting said feedback voltage signal when said blanking control signal is active, and the period during which said blanking control signal is active is adjustable along with said peak current;

d) a charge and discharge circuit having a first current source, a second switch and a second capacitor, wherein said first current source generates a first current signal according to said peak current of said main switch;

e) said second switch and said second capacitor being coupled in parallel, wherein said first current source charges said second capacitor, and a voltage across said second capacitor is configured as a second voltage signal; and f) a comparison circuit comprising a second comparator configured to compare said second voltage signal against a first reference signal, and to generate said blanking control signal.

4. The control circuit of claim 3, wherein said blanking time control circuit further comprises a second current source coupled in parallel to said first current source, wherein said second current source has a fixed value that is used to charge said second capacitor.

5. A method, comprising:

a) generating a blanking control signal according to a peak current of a main switch of a power stage circuit of a flyback converter, wherein said power stage circuit comprises a transformer having primary and secondary windings, said main switch coupled to said primary winding, and a rectifying diode coupled to said secondary winding;

b) generating a sampling time control signal according to said blanking control signal and a feedback voltage signal;

c) receiving said feedback voltage signal and said sampling time control signal, and determining the time of detecting said feedback voltage signal according to said sampling time control signal in order to obtain a detection signal for controlling said main switch;

d) using said feedback voltage signal to represent an output voltage at the secondary side of said transformer, wherein said voltage detection circuit stops detecting said feedback voltage signal when said blanking control signal is active, and the period during which said blanking control signal is active is adjustable along with said peak current;

e) charging a capacitor by a current source to generate a voltage signal across said capacitor; and f) comparing said voltage signal against a reference signal to generate said blanking control signal, wherein said current source is configured to generate a current signal according to said peak current of said main switch.

6. A method, comprising:

a) generating a blanking control signal according to a peak current of a main switch of a power stage circuit of a flyback converter, wherein said power stage circuit comprises a transformer having primary and secondary windings, said main switch coupled to said primary winding, and a rectifying diode coupled to said secondary winding;

b) generating a sampling time control signal according to said blanking control signal and a feedback voltage signal;

c) receiving said feedback voltage signal and said sampling time control signal, and determining the time of detecting said feedback voltage signal according to said sampling time control signal in order to obtain a detection signal for controlling said main switch;

d) using said feedback voltage signal to represent an output voltage at the secondary side of said transformer, wherein said voltage detection circuit stops detecting said feedback voltage signal when said blanking control signal is active, and the period during which said blanking control signal is active is adjustable along with said peak current e) receiving said feedback voltage signal and said blanking control signal;

f) directly transmitting said feedback voltage signal to a holding circuit when said blanking control signal is active;

g) transmitting said feedback voltage signal to said holding circuit through a delay circuit when said blanking control signal is inactive, and providing by said holding circuit a holding signal based on said feedback voltage signal;

h) receiving said feedback voltage signal, and generating a voltage signal that is greater than said feedback voltage signal; and i) generating said sampling time control signal based on said voltage signal and said holding signal.

* * * * *